S. W. MARTIN.
SCREW-TAP.
No. 177,410. Patented May 16, 1876.
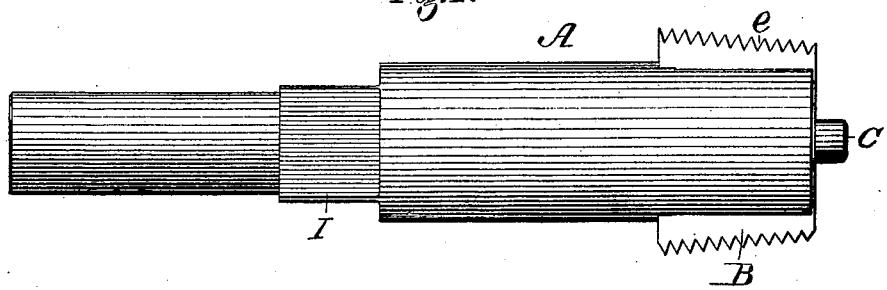
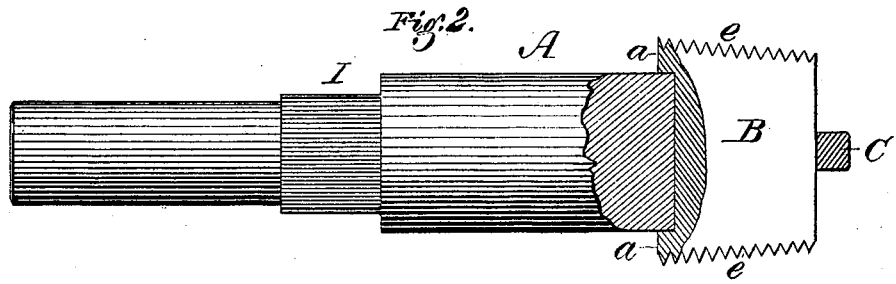
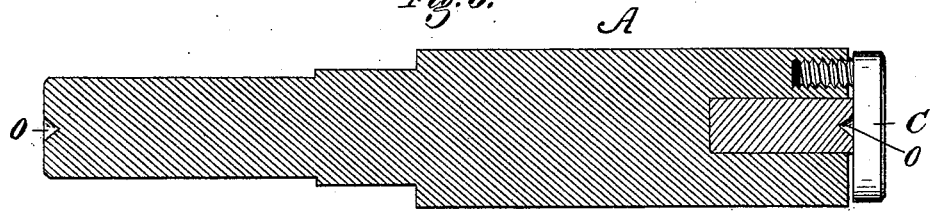
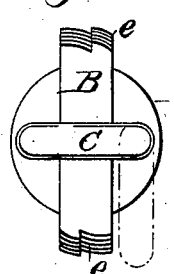
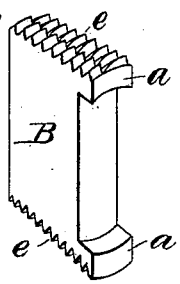
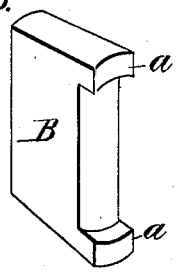
Witnesses:
Will H. Dodge.
Donn J. Tuntchell.
Inventor:
S. W. Martin,
by Dodge & Son,
Attys

UNITED STATES PATENT OFFICE.

SAMUEL W. MARTIN, OF SPRINGFIELD, OHIO, ASSIGNOR OF ONE-HALF HIS RIGHT TO PHINEAS P. MAST, OF SAME PLACE.

IMPROVEMENT IN SCREW-TAPS.

Specification forming part of Letters Patent No. 177,410, dated May 16, 1876; application filed April 5, 1876.

*To all whom it may concern:*

Be it known that I, SAMUEL W. MARTIN, of Springfield, in the county of Clarke and State of Ohio, have invented certain Improvements in Taps for Cutting Screw-Threads, of which the following is a specification:

My invention consists of an arbor or rod having a cutter fitted in a slot in its end, with teeth on its sides, for cutting screw-threads in holes, as hereinafter more fully described.

Figure 1 is a side elevation. Fig. 2 is a similar view, with a portion shown in section. Fig. 3 is a longitudinal section. Fig. 4 is an end view; and Figs. 5 and 6 are perspective views of the cutter, shown detached.

The object of this invention is to provide a tool to be used as a substitute for the ordinary tap for cutting screw-threads in holes, and by means of which the work can be better and more expeditiously performed.

To construct my improved tool I provide an arbor or rod, A, in one end of which I cut a transverse slot of proper size to receive the cutter B. I then make a cutter, B, of steel, of the form shown in the drawings, it being of such a thickness as to fit snugly in the slot in the end of the arbor or holder, as shown in Figs. 1, 2, and 3. This cutter B is made slightly narrower at its front than at its rear end, so as to make it tapering, as shown in Figs. 1 and 2, and along each of its projecting edges it is provided with a double row of cutting-teeth, e, as shown in Figs. 1, 2, 4, and 5. At its rear end it is cut away centrally, equal to the size of the arbor, thereby leaving a projecting lip or shoulder, a, at each side, as shown in Figs. 5 and 6, the latter representing the blank before the teeth are formed on it, and the former representing it complete, ready for inserting in the arbor or stock.

It will be observed that these shoulders a are cut away on their inner sides on a curve corresponding with the exterior of the arbor or stock, so that when the cutter is inserted in the slot these shoulders will fit snugly and solidly on the sides of the bar or arbor, and thus hold the cutter securely in place and prevent it from moving laterally in its seat. To hold the cutter in its slot I apply a dog-screw, C, as shown in Fig. 3, it being so arranged that when turned across the end of the cutter, as represented in Fig. 4, it will hug close upon the cutter, as shown in Fig. 3. To release the cutter the dog-screw C is turned back, as indicated by dotted lines in Fig. 4, when the cutter can be drawn out of the slot.

At its outer end the cutter B is provided with a center or cavity, o, as shown in Fig. 3, the arbor being provided at its opposite end with a similar center, whereby the tool can be held and operated between the centers of a lathe, the dog-screw C being either swung to one side out of the way or entirely removed at such times, the cutter being held in place by the pressure on its end by the lathe-center.

The arbor or bar A may have its end opposite the cutter reduced in size, and provided with a square shoulder, I, as shown, for securing it in a lathe or other machine, by which it is to be operated, or it may be tapered or fitted in any other manner desired.

A tap constructed on this plan will operate better and more readily than the round taps ordinarily used, it having a much better clearance, and the teeth being presented at such an angle as to cut away the metal like a chisel, instead of tending to force or crowd the metal back upon the solid or uncut portion.

Having thus described my invention, what I claim is—

1. The bar or mandrel A, having a slot formed in its end, in combination with the cutter B, provided with the lips a, as shown and described.

2. In combination with the bar A and cutter B, the dog-screw C, constructed and arranged to operate substantially as set forth.

SAMUEL W. MARTIN.

Witnesses:
J. J. HANNA,
D. P. JEFFERIES.